(12) United States Patent
Banerjee et al.

(10) Patent No.: US 8,437,275 B2
(45) Date of Patent: May 7, 2013

(54) REMOTE WIRELESS SERVICE INVOCATION WITH EFFICIENT POWER USE ON TARGET WIRELESS DEVICE

(75) Inventors: Anirban Banerjee, Issaquah, WA (US); Hui Shen, Sammamish, WA (US); Saurabh Mahajan, Redmond, WA (US); Amer A. Hassan, Kirkland, WA (US); Hong Liu, Sammamish, WA (US); Noel W. Anderson, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 728 days.

(21) Appl. No.: 12/636,067

(22) Filed: Dec. 11, 2009

(65) Prior Publication Data
US 2011/0142014 A1   Jun. 16, 2011

(51) Int. Cl.
*H04L 12/28* (2006.01)
*H04L 12/56* (2006.01)
*H04W 72/00* (2009.01)
*G06F 7/04* (2006.01)

(52) U.S. Cl.
USPC ...... 370/254; 370/348; 370/395.21; 455/464; 726/2

(58) Field of Classification Search .................. None
See application file for complete search history.

(56) References Cited

U.S. PATENT DOCUMENTS

| | | |
|---|---|---|
| 6,950,645 B1 | 9/2005 | Kammer et al. |
| 6,970,127 B2 | 11/2005 | Rakib |
| 7,082,116 B2 | 7/2006 | Reza et al. |
| 7,593,751 B2 | 9/2009 | Barbosa et al. |
| 7,593,963 B2 | 9/2009 | Ballesty et al. |
| 2004/0170134 A1* | 9/2004 | Furuyama et al. ............ 370/310 |
| 2008/0031208 A1 | 2/2008 | Abhishek et al. |
| 2008/0031210 A1 | 2/2008 | Abhishek et al. |
| 2008/0112334 A1 | 5/2008 | Laroia et al. |
| 2009/0016248 A1 | 1/2009 | Li et al. |
| 2009/0047991 A1 | 2/2009 | Elg |
| 2009/0119698 A1 | 5/2009 | Kuijlaars |
| 2009/0219901 A1 | 9/2009 | Bull et al. |

OTHER PUBLICATIONS

Chin et al., "m-Roam: A service invocation and roaming framework for pervasive computing" *IEEE Computer Society*, (2004), pp. 1-8.
Halteren et al., "Mobile Service Platform: A Middleware for nomadic mobile service provisioning" *IEEE* (Jun. 19-21, 2006), pp. 292-298 http://ieeexplore.ieee.org/stamp/stamp.jsp?tp=&arnumber=1696373&isnumber=35739.

* cited by examiner

*Primary Examiner* — Chirag Shah
*Assistant Examiner* — Ashley Shivers

(57) ABSTRACT

A protocol for operation of wireless devices enables a wireless device to remotely and securely invoke a service on a target wireless device without requiring the user of the target wireless device to take any action and without requiring the target wireless device to use power unnecessarily. Mutual authentication is executed while the target wireless device remains in a low power discoverable mode. The discoverable mode includes discovery windows separated by inactive windows when the radio of the target wireless device is powered down.

18 Claims, 9 Drawing Sheets

250 # REMOTE WIRELESS SERVICE INVOCATION WITH EFFICIENT POWER USE ON TARGET WIRELESS DEVICE

TECHNICAL FIELD

This invention relates to wireless networks and, more particularly, to remote service invocation, by a first wireless device, on a target wireless device, with efficient power use on the target wireless device.

BACKGROUND

In a typical wireless network, one or more wireless devices are associated with a common wireless access point, which may be connected to a wired network. Communication between wireless devices is through the access point. Such operation is known as the infrastructure operating mode.

Adoption of Wi-Fi technology is increasing in all market segments. Traditional usage scenarios made use of an access point as an intermediary node for communication between two wireless devices. However, usage scenarios have developed where Wi-Fi devices need to communicate directly with each other without going through an intermediate device such as an access point. These scenarios are commonly called P2P (point-to-point) based scenarios. For P2P scenarios to be usable, issues associated with discoverability, pairing and invocation of services should be resolved, while maintaining minimal power consumption.

SUMMARY

The present invention provides methods and apparatus for a wireless device to remotely and securely invoke a service on a target wireless device without requiring the user of the target wireless device to take any action and without requiring the target wireless device to use power unnecessarily. The methods thus provide remote and authenticated service invocation on a target wireless device, with no manual intervention on the target wireless device, and efficient power usage on the target wireless device. The methods further include mutual authentication of wireless devices based on a shared secret during discovery windows separated by periods when the radio of the target wireless device is powered down.

According to a first aspect of the invention, a method is provided to operate a first computing device in communication with a second computing device. The method comprises: operating the first computing device in a discoverable mode including alternating between a discovery window of a discovery period and an inactive window of the discovery period; responding to a discovery request received from the second computing device during the discovery window of the discovery period; responding to an authentication request received from the second computing device during the discovery window of the discovery period; remaining in the discoverable mode at least until the first computing device has authenticated the second computing device; establishing, based on successful mutual authentication, a secure channel to the second computing device; and receiving a service invocation request from the second computing device on the secure channel and enabling execution of the requested service.

In some embodiments, the first computing device comprises a first wireless device and the second computing device comprises a second wireless device. In these embodiments, a radio of the first wireless device may be powered down during the inactive window.

According to a second aspect of the invention, a wireless device comprises: a computing device; a radio; and a wireless module logically connected to the computing device and to the radio, the wireless device comprising a processor programmed with instructions for: operating the wireless device in a discoverable node including alternating between a discovery window of a discovery period and an inactive window of the discovery period, the radio of the wireless device being powered down during the inactive window; responding to a discovery request received from a second wireless device during the discovery window of the discovery period; responding to an authentication request received from the second wireless device during the discovery window of the discovery period; remaining in the discoverable mode at least until the wireless device has authenticated the second wireless device; establishing, based on successful mutual authentication, a secure channel to the second wireless device; and receiving a service invocation request from the second wireless device on the secure channel and enabling execution of the requested service.

According to a third aspect of the invention, a method is provided to operate a second wireless device in direct communication with a first wireless device. The method comprises: operating the second wireless device in an active discovery mode during an active discovery period; transmitting one or more discovery requests during the active discovery period; receiving from the first wireless device a discovery response that specifies a time and a duration of a discovery window of the first wireless device; transmitting an authentication request to the first wireless device during the discovery window of the first wireless device; establishing, based on successful mutual authentication, a secure channel to the first wireless device; and transmitting a service invocation request to the first wireless device on the secure channel.

DETAILED DESCRIPTION

Figure 1:
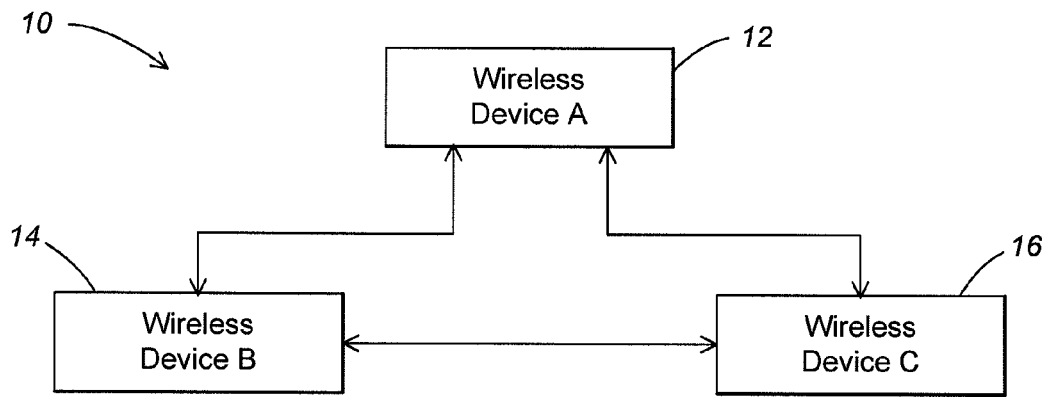
FIG. 1 is a simplified block diagram of an ad hoc wireless network.

Embodiments of the invention provide protocols for a wireless device to remotely and securely invoke a service on a target wireless device without requiring the user of the target device to take any action and without requiring the target device to use power unnecessarily. The invention is most useful in the absence of mediating devices, such as access points, but is not limited to such use. The remote service invocation includes mutual authentication.

The protocols of the present invention may involve software in the wireless devices. The protocols can also be implemented in hardware and/or firmware of a wireless device. This allows wireless devices having these protocols to communicate and to perform authenticated remote service invocation on target wireless devices.

The following examples demonstrate the need for power efficient remote service invocation. In these examples, device A and device B are two Wi-Fi capable devices, and device B wants to remotely invoke a service on device A.

In a first example, a Wi-Fi capable smartphone (device B) wants to connect to a laptop (device A) in order to synchronize photos. The laptop has to start its Wi-Fi personal area network so that the smartphone can connect to it. A mechanism is needed for the smartphone to ask the laptop to start its hosted network. The mechanism should be easy for the user, secure and power efficient.

In a second example, an application program on a laptop (device B) wants a smartphone (device A) to connect to it in order to synchronize photos. The laptop has started its Wi-Fi personal area network and wants the smartphone to turn on its Wi-Fi radio to connect to the hosted network and start synchronizing. A mechanism is needed for the laptop to ask the smartphone to start its connection engine, perform a scan and connect to the laptop. The mechanism should be easy for the user, secure and power efficient.

Embodiments of the invention operate under the following assumptions. Devices A and B are Wi-Fi enabled and have been previously paired. Pairing means: (1) devices A and B have a shared secret generated with sufficiently high entropy to ensure security; (2) the shared secret may have been established by users of these devices by using a protocol such as Wi-Fi Protected Setup from Wi-Fi Alliance, for example; and (3) the shared secret can be used for mutual authentication. Device B needs to use a service on device A. A device C is a malicious Wi-Fi enabled device without a previous pairing relationship with device A. Device C wants device A to lose power unnecessarily. Device A does not want to give this capability to device C. Furthermore, device A does not want to continuously lose power in order to listen for a service invocation request from device B. As described below, device A executes the power-efficient discovery protocol. In addition, manual starting of the requested service by the user of device A may be avoided. The present invention provides a mechanism for device B to remotely invoke the service on device A under these conditions.

In accordance with embodiments of the invention, the protocol for remote service invocation utilizes a staged approach. The stages are: (1) device and capability discovery; and (2) device authentication and service invocation. The first stage, which involves device capability and discovery, may be implemented as an extension of the discovery technique described in U.S. Patent Pub. No. 2008/0031208, which is hereby incorporated by reference in its entirety. The device and capability discovery stage is described below.

An example of a wireless network 10 is shown in FIG. 1. Wireless devices 12, 14 and 16 communicate with each other by wireless links. The wireless devices communicate using the mechanisms described below. It is assumed that each wireless device is within radio range of at least one other wireless device in the network. It will be understood that all wireless devices in the network do not need to be within radio range. For example, wireless devices 14 and 16 may be able to communicate directly with wireless device 12 but may not be able to communicate directly with each other. By way of example only, wireless devices 12, 14 and 16 may be laptop computers, mobile phones, mobile data devices, portable media player devices, home stereos, wireless speakers, or combinations of such devices which utilize a compatible protocol as described below.

Figure 2:
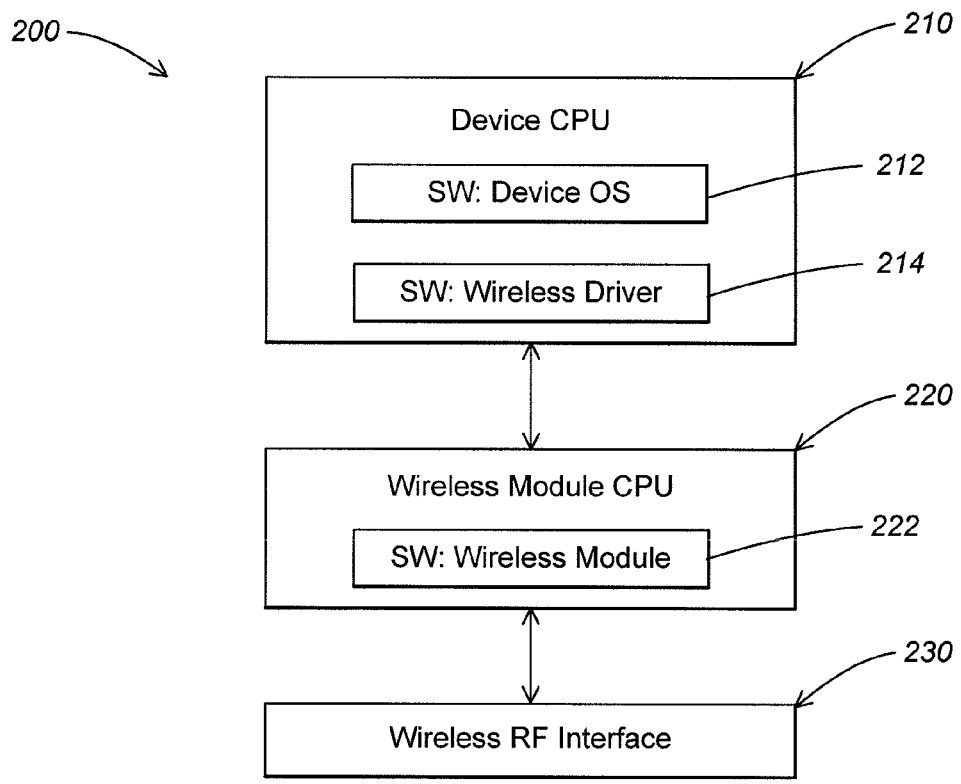
FIG. 2 is a simplified block diagram of a wireless device suitable for implementation of the invention.

A simplified block diagram of a wireless device 200 including components involved in communication in a wireless network is shown in FIG. 2. Wireless device 200 may correspond to wireless devices 12, 14 and 16 shown in FIG. 1. An upper layer device CPU 210 interfaces with peripheral components present in the wireless device, such as a display, a keypad or a keyboard, a pointing device, a storage unit such as a disk unit or a flash memory and any other peripheral components of the device. Device CPU 210 includes a device operating system 212 and a wireless driver 214. The wireless driver 214 communicates with a second layer wireless module CPU 220 containing wireless module software 222. The wireless module software 222 interfaces with a lower layer wireless RF interface 230 which communicates with a radio that transmits and receives RF signals via an antenna.

The wireless device 200 may represent a variety of different devices that may be hand-held and mobile or stationary. Examples of wireless devices include, but are not limited to, laptop computers, desktop computers, mobile data devices, mobile phones, stereo systems, and wireless speakers.

The operations of each wireless device in discovering and synchronizing with other wireless devices are described below. Operation is described in connection with the IEEE 802.11 standard. However, the present invention is not limited to the 802.11 standard and can be utilized in connection with other wireless protocols, such as Ultra Wide Band and WiNet. It will be understood that the operations described below are embodiments only and are not limiting as to the scope of the invention.

When a wireless device has its wireless operation turned on, it can be set in one of two discovery modes: discoverable mode or active discovery mode.

A wireless device is set to be in the discoverable mode if the user expects neighbor wireless devices to be in proximity and wants to be discovered by other wireless devices as well as to discover neighbor wireless device passively. In this mode, the wireless device is able to detect neighbor devices which are actively discovering, and to also announce its existence. The passive discovery mode is most useful when maintained for long periods without unacceptable power loss, but is not limited to such use.

A wireless device is set to be in the active discovery mode on user demand. In this mode, the wireless device actively detects neighbor wireless devices which are in active or discoverable mode, and also announces its own existence to those devices.

Parameters

Discovery Interval: A period of time that a wireless device periodically switches from power save mode and discovers neighbor wireless devices in the discoverable mode. This time period includes the discovery window.
  For example: 2000 ms.
Discovery Window: A period of time that a wireless device remains with power on and performs passive discovery.
  For example: 100 ms.
Active Probe Interval: A time slot in which a wireless device divides a probe period into multiple time slots. The probe interval may be smaller than the discovery window.
  For example: 80 ms.
Active Probe Period: A period of time that a wireless device performs active discovery operation on demand. This time period includes multiple Probe Periods. A probe period may be larger than the discovery interval and preferably a multiple of discovery intervals.

For example: 2100 ms.

All devices may have the same values pre-configured for the above parameters.

Wireless devices wake up periodically to maintain discoverability, and they do not send advertisement packets, such as beacon packets in IEEE 802.11 networks, into the wireless medium. The wireless devices utilize only probe request and response packets to achieve discoverability.

Figure 3:
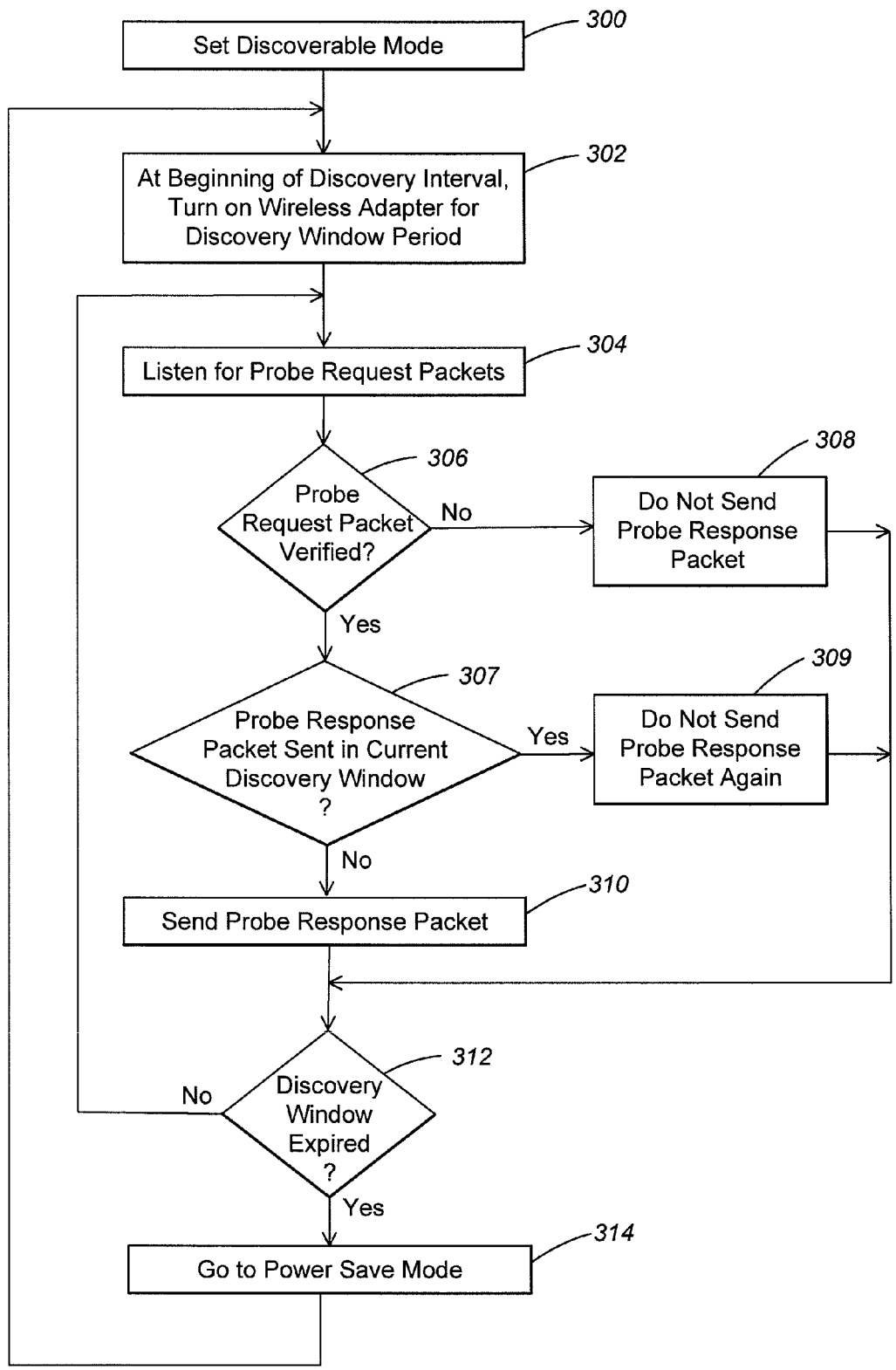
FIG. 3 is a flow chart that illustrates discoverable mode operation by a wireless device in the wireless network.

A flow chart of discoverable mode operations is shown in FIG. 3.

1) A wireless device switches to the discoverable mode on demand. The device does the following:
   Set to be in discoverable mode, step 300.
   This request may have the following parameters or use pre-configured default values:
   Discovery Interval, and
   Discovery Window.

When a wireless device wants to be discovered by other devices, it stays in the discoverable mode. When a device is in the discoverable mode, it can stop sending out any periodic beacon packets.

The values of these parameters can be pre-defined as default values or can be set by the application which sets the device into the discoverable mode.

1) The wireless device stays in the power save mode in most of the discovery interval.

It does so by turning off its wireless radio. At the beginning of each Discovery Interval, the wireless device wakes up from the power save mode for a period of time equal to the Discovery Window, step 302. During this window, the device parks at a discovery channel which is commonly used by all the devices for discovery purposes.

2) The wireless device listens for probe request packets, step 304. When the device receives a probe request packet, optionally, the wireless module verifies that it wants to respond to the probe packet.

If a wireless device wants to verify a probe request packet, it can do so in different ways, provided the method is mutually agreed and understood by the devices involved in the discovery process. For example:

The probe request packet may be an IEEE 802.11 probe request packet. In addition, the packet can contain information to specify the intention of discovering a particular type of device and settings. The packet may have the following information:
   Packet type: probe request packet
   Receiver's address: broadcast address (FF-FF-FF-FF-FF-FF)
   SSID: (broadcast SSID: 0-length IE)
   BSSID: broadcast address (FF-FF-FF-FF-FF-FF)
   BSS type: ad hoc
   Other information (e.g., timestamp)
   Special information:
   Operation type—discovery request
       Other optional device/configuration specific information 3) If the probe request packet is verified, step 306, the wireless device checks to determine if it has sent a probe response packet earlier in the current discovery window, step 307. If not, the probe request is honored and a probe response packet is sent, step 310. Otherwise, the wireless device can choose to not send a probe response packet, step 309, to reduce wireless channel usage and interference. The wireless device replies to the probe request packet by sending a probe response packet, step 310, provided the packet format and content are mutually agreed and understood by the devices involved in the discovery process. For example:

The probe response packet may be an IEEE 802.11 probe response packet. Optionally, the packet can contain information to specify the intention of responding to a discovery for a particular type of device and settings. The packet may have the following information:
   Packet type: probe response packet
   Receiver's address: unicast address (to the sender of the probe request), or broadcast address (if sender wants to be discovered by all devices in proximity)
   SSID: current SSID (if available)
   BSSID: current BSSID (if available)
   BSS type: ad hoc
   Other information (e.g., timestamp)
   Special information:
       Operation type—discovery response
       Other optional device/configuration specific information Otherwise, the device decides not to honor the probe request packet and does not send a probe response packet, step 308. However, the probe request packet can be used to discover a neighbor wireless device.

4) When the discovery window expires for the current discovery interval, step 312, the device goes to the power save mode, step 314, and does not receive or send any packets.

5) In the discoverable mode, the wireless device repeats the operations from 1) to 4) (steps 302 to 314).

Figure 4:
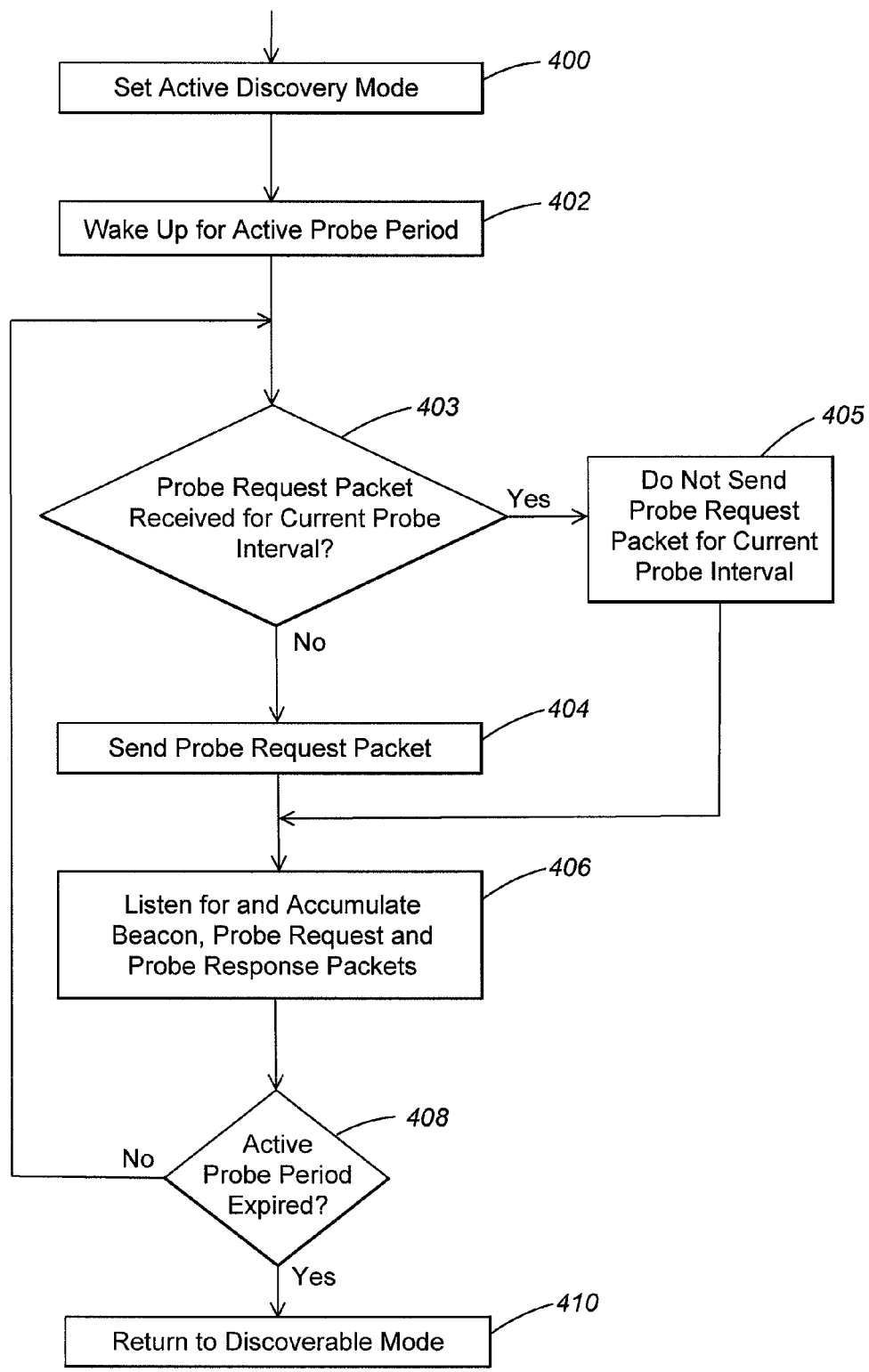
FIG. 4 is a flow chart that illustrates active discovery by a wireless device in the wireless network.

A flow chart of active discovery mode operations is shown in FIG. 4.

When a wireless device wants to actively discover other devices, the wireless device does the following:

1) Issue a scan request call (set active discovery mode, step 400):
   Scan (to actively discover other devices)
   The scan request call may have the following parameters or use pre-configured default values:
   Scan type: active scan
   Special IE (information element) information: (optional)

2) When receiving the scan request call, the wireless module does the following:
   The device wakes up if it is in the power save mode for an active probe period, step 402, a period of time no less than discovery interval, for example 2100 ms.

The wireless device does the following for each active probe interval, a period of time which is no longer than the discovery window, for example 80 ms. If the wireless device does not receive any probe request packets from other wireless devices in the current probe interval, step 403, it then sends out a probe request packet in the discovery channel, step 404. Otherwise, the wireless device can choose not to send a probe request packet for the current probe interval, step 405, to reduce channel usage and interference.

The probe request packet has a packet format and content that are mutually agreed and understood by the devices involved in the discovery process. For example:

The probe request packet may be an 802.11 probe request packet. Optionally, the packet can contain information to specify the intention of requesting discovery for a particular type of device and settings. The packet can have the following information:
   Packet type: probe request packet
   Receiver's address: broadcast address (FF-FF-FF-FF-FF-FF)
   SSID: (broadcast SSID: 0-length IE)
   BS SID: broadcast address (FF-FF-FF-FF-FF-FF)
   BSS type: ad hoc
   Other information (e.g., timestamp)
   Special IE:
       Operation type—discovery request
       Other optional local information 3) After sending out each probe request packet, the wireless device remains awake and listens to the probe response packets from other devices, step 406. It can do so by parking on each channel to listen to probe response packets for a period of time.

The probe response packet has a packet format and content that are mutually agreed and understood by the devices involved in the discovery process. For example:

The probe response packet may be an IEEE 802.11 probe response packet. Optionally, the packet can contain information to specify the intention of responding a discovery for a particular type of device and settings. The packet may have the following information:
 Packet type: probe response packet
 Receiver's address: unicast address (to the sender of the probe request), or broadcast address (if sender wants to be discovered by all devices in proximity)
 SSID: current SSID (if available)
 BSSID: current BSSID (if available)
 BSS type: ad hoc
 Other information (e.g., timestamp)
 Special IE:
  Operation type—discovery response
  Other optional local information
4) When the active probe period expires, step 408, the wireless device returns to its initial state, step 410.

Figure 5:
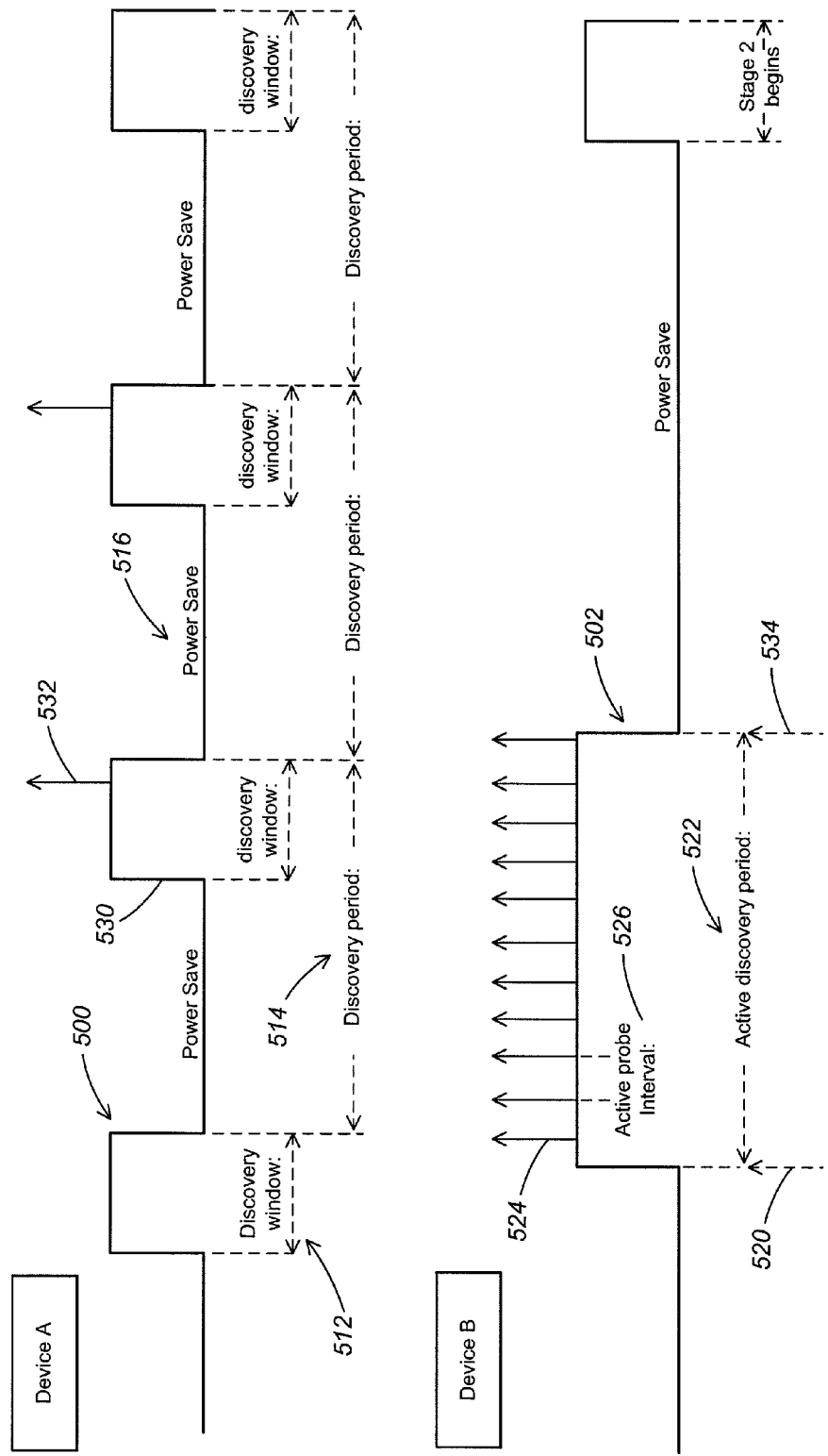
FIG. 5 is a timing diagram that illustrates an example of device and capability discovery in accordance with embodiments of the invention.

A timing diagram that illustrates an example of first stage device and capability discovery is shown in FIG. 5. A waveform 500 represents a device A, such as wireless device 12 shown in FIG. 1, in a discoverable mode. A waveform 502 represents a device B, such as wireless device 14 in FIG. 1, in an active discovery mode. In discussing embodiments of the invention, Device A may be considered the target wireless device. Device A turns on its radio during a discovery window 512, which is repeated each discovery period 514. Between discovery windows 512, device A is in a power save mode 516 in which its wireless radio is turned off. In the example of FIG. 5, the discovery window 512 is 100 msec and the discovery period 514 is 2000 msec.

Device B is initially in discoverable mode and starts active discovery at time 520 in response to a user request. For example, device B turns on for an active discovery period 522 which is greater than the discovery period 514 utilized in the discoverable mode. In the example of FIG. 5, the active discovery period is 2100 msec. During the active discovery period, device B sends multiple probe requests 524 separated by an active probe interval 526. The active probe interval 526 is shorter than the discovery window 512 and is selected to ensure that at least one of the probe requests is received during the discovery window of other wireless devices in proximity to device B. Device A receives a probe request from device B during discovery window 530 and sends a probe response at time 532. The probe response from device A and probe responses from other devices in proximity are accumulated and saved by device B. At time 534 the active discovery period expires, and device B returns to the discoverable mode. In the discoverable mode, device B turns on its radio during the discovery window of each discovery period and is in power save mode for the remainder of each discovery period.

The two-stage approach to wireless service invocation may be referred to as the Power Efficient Wireless Service Invocation (PEWSI) protocol. The first stage of the PEWSI protocol is essentially an extension of the discovery technique described above and in U.S. 2008/0031208. A device that is compatible with the PEWSI protocol can generate appropriate probe responses that tell other wireless devices that it supports PEWSI protocol. The probe responses may differ from a standard IEEE 802.11 probe response in the following ways.

1) The probe response does not include the SSID fixed field. The probe responses should not be identified as standard Wi-Fi access point advertisements.

2) A protocol-specific information element (IE) contains protocol-specific parameters, including (a) the start time of the next discovery window relative to a timestamp; (b) the duration of the discovery window and the discovery period; and (c) a list of supported service IDs without associated descriptions.

In summary, the steps of device and capability discovery are as follows:

1) Device A is in the passive discovery mode. This may be a one-time configuration by the user after acquiring the device.

2) Device B determines the need to request a service on device A. This may be initiated by a user or by a timer interrupt handler on device B.

3) Device B enters the active discovery mode and discovers device A during the discovery window of device A. Device B validates the contents of the probe response from device A and proceeds only if the probe response is valid.

4) From the probe response, device B knows the timing of the discovery window of device A.

5) Device B executes the later stages of the protocol during the discovery window of device A. Device B does not modify its own discovery schedule for this purpose. In addition, device B insures that its wireless radio is powered on during the discovery window of device A.

As indicated above, the second stage of the protocol for remote service invocation includes device authentication and service invocation. At the beginning of the second stage, device B knows when to execute the remaining parts of the protocol, since the timing of the discovery window of device A has been determined during the first stage. Since there has been no authentication thus far in the process, the synchronization information may be available to any other devices, including a malicious wireless device. Thus far, device A has not changed state.

The steps of the device authentication and service invocation stage are as follows:

1) Device B and device A execute mutual authentication using a shared secret. The shared secret has sufficiently high entropy to ensure secure communication. For example, the mutual authentication may be achieved as follows.
 a) Device B waits for device A to enter its discovery window. Device B can optionally verify that device A is in its discovery window by sending a unicast Class 1 packet, such as a unicast probe request, to device A.
 b) Device B executes a mutual authentication protocol, based on the shared secret, with device A during the discovery window of device A. The mutual authentication protocol may include the following.
  (i) Device B executes a virtual association with device A. The virtual association may be similar to an IEEE 802.11 association between a station (STA) and an access point (AP), with device B acting as the STA and device A acting as the AP. The association is described as virtual, because the actual process may be slightly different from the IEEE 802.11 association process.
  (ii) Device B and device A execute RSNA-PSK (Robust Security Network Association-Preshared Key) as specified by IEEE 802.11(i). In this process, device B acts as the STA and device A acts as the AP.

2) Device B and device A establish a secure channel for short term use based on the mutual authentication of step 1 above.

3) Device B forwards a service invocation request to device A using the secure channel.

4) Device B and device A optionally use the secure channel to exchange additional details regarding the service invocation request.

5) Device B and device A close the short term secure channel and the virtual association. Device A is thereby enabled to execute the requested service.

In some situations, mutual authentication may not complete within a single discovery window of device A. After device A has authenticated device B, device A can maintain its wireless radio powered on as a courtesy to device B during the execution of the protocol. However, extending this courtesy before device A has authenticated device B could permit a denial of service attack by a malicious device which does not have the shared secret. Using RSNA-PSK based mutual authentication as an example, a standard laptop to Wi-Fi access point based authentication may take up to 200 msec.

The relatively long time for mutual authentication can be mitigated by one or more of the following approaches.

1) Reduce the overall time to execute mutual authentication. Performance improvements may be achieved, for example, by condensing the IEEE 802.11 authentication/association process for this protocol. For example, the RSN-IE can be included in the probe request sent during the first stage or in the verification packet sent during the initial portion of the second stage. Also, device A can send the IEEE RSNA-PSK security frame M1 without an actual association if device B has previously provided all the information in the probe request.

2) The discovery window of device A may be extended based on partial authentication. When device A receives and validates frame M2 it can verify knowledge of the shared secret by device B and can decide to keep its radio power on for an additional 100 msec, for example.

3) The overall authentication process can be divided across two or more consecutive discovery windows. Since both devices know the discovery schedule of device A, the authentication state machines on both devices can be modified to account for the inactive window, thus preventing the state machines from timing out. For example, various steps of the authentication process can be executed in consecutive discovery windows.

4) The discovery window and the inactive window can be scaled on all devices by a known amount. For example, every device may be in discovery mode for 150 msec and in inactive mode for 2850 msec.

Figure 6:
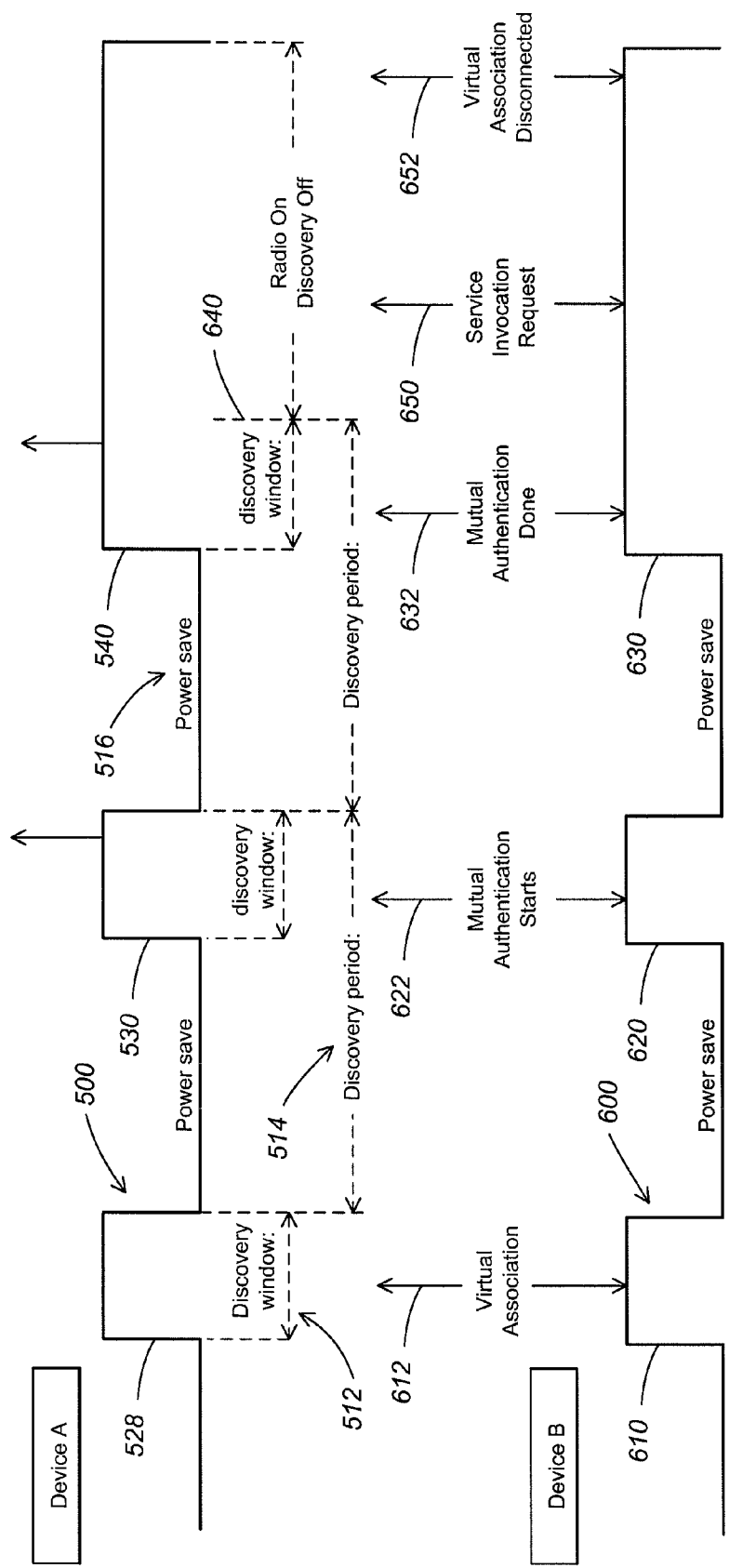
FIG. 6 is a timing diagram that illustrates an example of remote and authenticated service invocation in accordance with embodiments of the invention.

A timing diagram that illustrates an example of second-stage device authentication and service invocation is shown in FIG. 6. Waveform 500 represents device A in the discoverable mode. Waveform 600 represents device B in the remote authentication and service invocation mode. As described above in connection with FIG. 5, device A turns on during discovery window 512, which is repeated every discovery period 514. Between discovery windows 512, device A is in the power save mode 516. As in the example of FIG. 5, the discovery window 512 is 100 msec and the discovery period is 2000 msec.

Device B knows the timing of the discovery window of device A and turns on during window 610, which is synchronized to discovery window 528 of device A. During window 610, device B sends a virtual association request to device A at time 612. Device B may enter the power save mode when device A is in the power save mode. During window 620 of device B, which is synchronized to discovery window 530 of device A, mutual authentication begins at time 622. Again, device B may enter the power save mode when device A is in the power save mode. It is assumed that mutual authentication was not completed during discovery window 530 of device A. Device B again turns on at time 630 in synchronism with discovery window 540 of device A. Mutual authentication is completed at time 632 during discovery window 540 of device A. Based on authentication of device B by device A, device A exits the discoverable mode and leaves its wireless radio on at time 640. With devices A and B both on, device B transmits a service invocation request over a secure channel to device A at time 650. The secure channel is established after successful mutual authentication. At time 652, the remote service invocation request has been completed, and the virtual association between devices A and B is disconnected. The request can then be processed as appropriate.

It may be noted that device A remains in the discoverable mode until device A has authenticated device B. If a mutual authentication request is received from a malicious wireless device not having the shared secret, authentication of device B will fail, and device A will remain in discoverable mode, thereby avoiding unnecessary use of power. Even in the case of a valid mutual authentication request, authentication of device B is completed with device A in the discoverable mode and avoiding unnecessary use of power.

Figure 7:
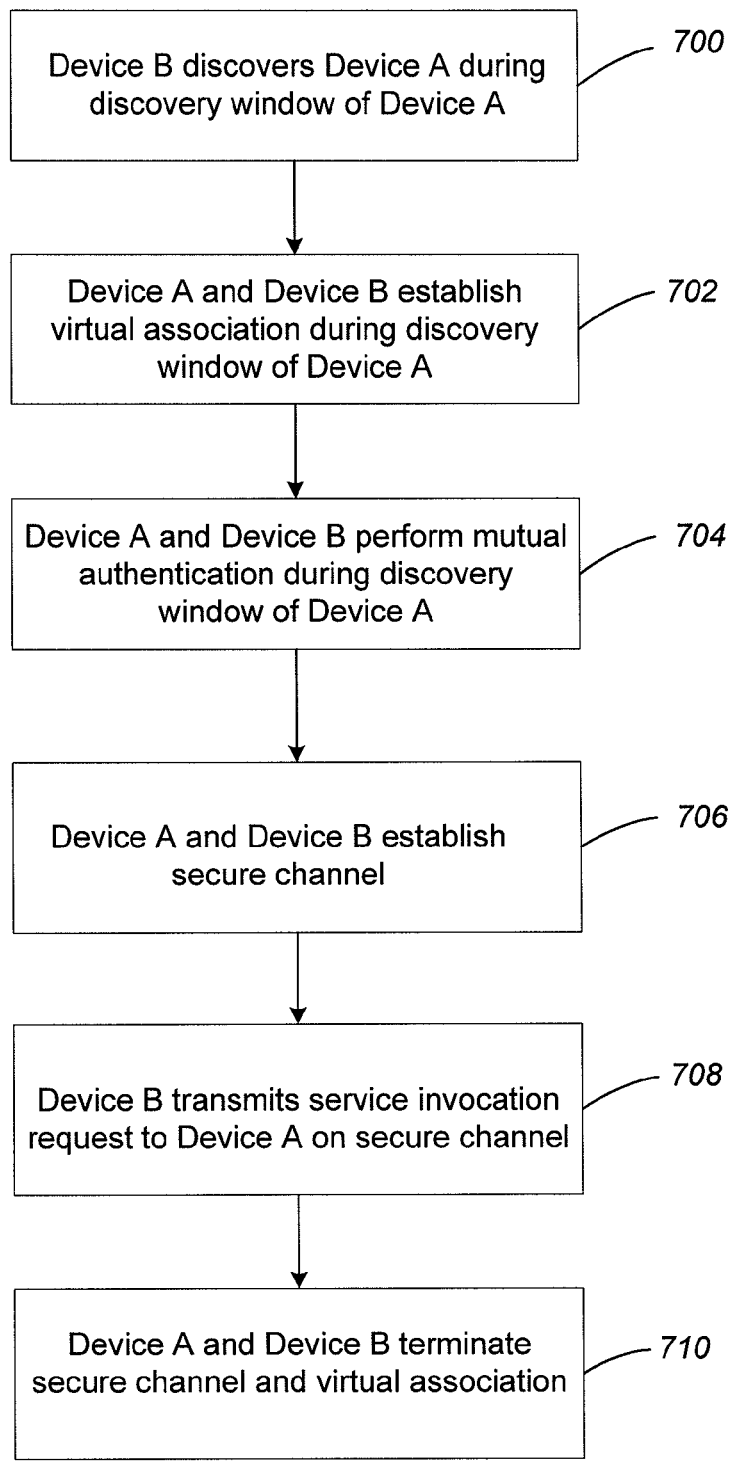
FIG. 7 is a flow chart that illustrates discovery and remote service invocation in accordance with embodiments of the invention.

A flow chart of an embodiment of the protocol for remote authenticated service invocation is shown in FIG. 7. In act 700, device B discovers device A during the discovery window of device A, as illustrated in FIGS. 3-5 and described above. Act 700 corresponds to the first stage of the remote service invocation protocol. In act 702, device A and device B establish a virtual association during the discovery window of device A, as illustrated at time 612 in FIG. 6. In act 704, device A and device B, perform mutual authentication during the discovery window of device A. As shown in FIG. 6, mutual authentication begins at time 622 during discovery window 530 of device A and is completed at time 632 during discovery window 540 of device A. In other situations, mutual authentication may be completed during a single discovery window of device A or may require more than two discovery windows of device A. However, device A does not leave the discovery mode until device A has authenticated device B. In act 706, device A and device B establish a secure channel after successful mutual authentication. In act 708, device B sends a service invocation request to device A on the secure channel. As shown in FIG. 6, a service invocation request is sent by device B to device A at time 650. Upon completion of the service invocation request and optional exchange of related information, device A and device B terminate the secure channel and the virtual association in act 710. As shown in FIG. 6, the virtual association is disconnected at time 652.

Figure 8:
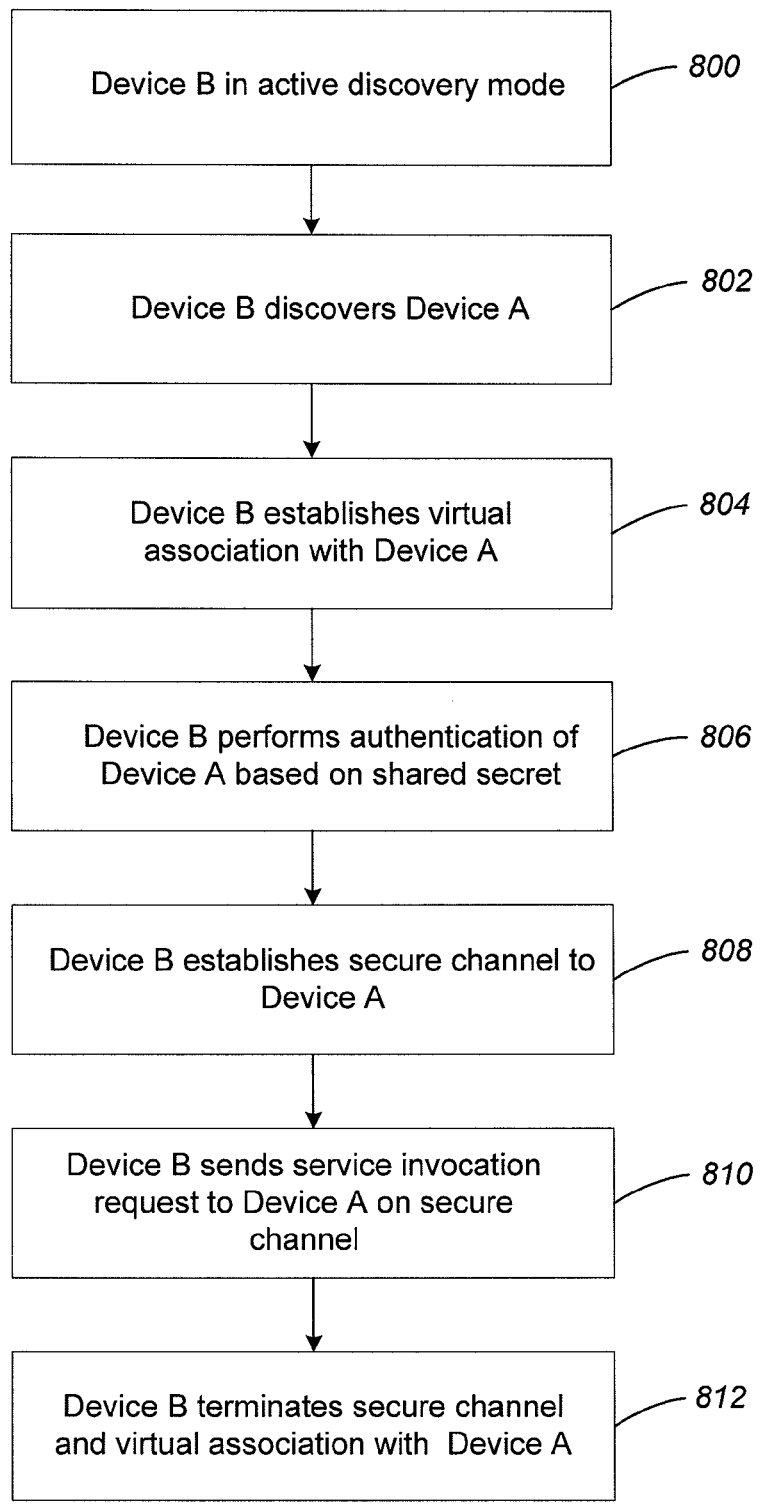
FIG. 8 is a flow chart that illustrates active discovery and remote service invocation by a wireless device.

A flow chart of the operations performed by device B in the remote authenticated service invocation protocol is shown in FIG. 8. In act 800, device B enters the active discovery mode, which may be in response to a user input or an interrupt, for example. In act 802, device B discovers device A, using the discovery process shown in FIGS. 3-5 and described above. In act 804, device B establishes a virtual association with device A, as shown at time 612 in FIG. 6. The virtual association is established by device B during the discovery window of device A, based on the discovery schedule obtained during the first stage of the protocol. In act 806, device B performs authentication of device A based on a shared secret. Mutual authentication may be performed during one or more discovery windows of device A. As shown in FIG. 6, mutual authentication begins at time 622 during discovery window 530 of device A and is completed at time 632 during discovery window 540 of device A. In act 808, device B establishes a secure channel to device A based on successful mutual authentication, and in act 810, device B sends a service invocation request to device A on the secure channel. As shown in FIG. 6, the secure invocation request is sent at time 650. After transmission of the service invocation request and optional exchange of related information, device B terminates the secure channel and the virtual association with device A in act 812. As shown in FIG. 6, the virtual association is disconnected at time 652.

Figure 9:
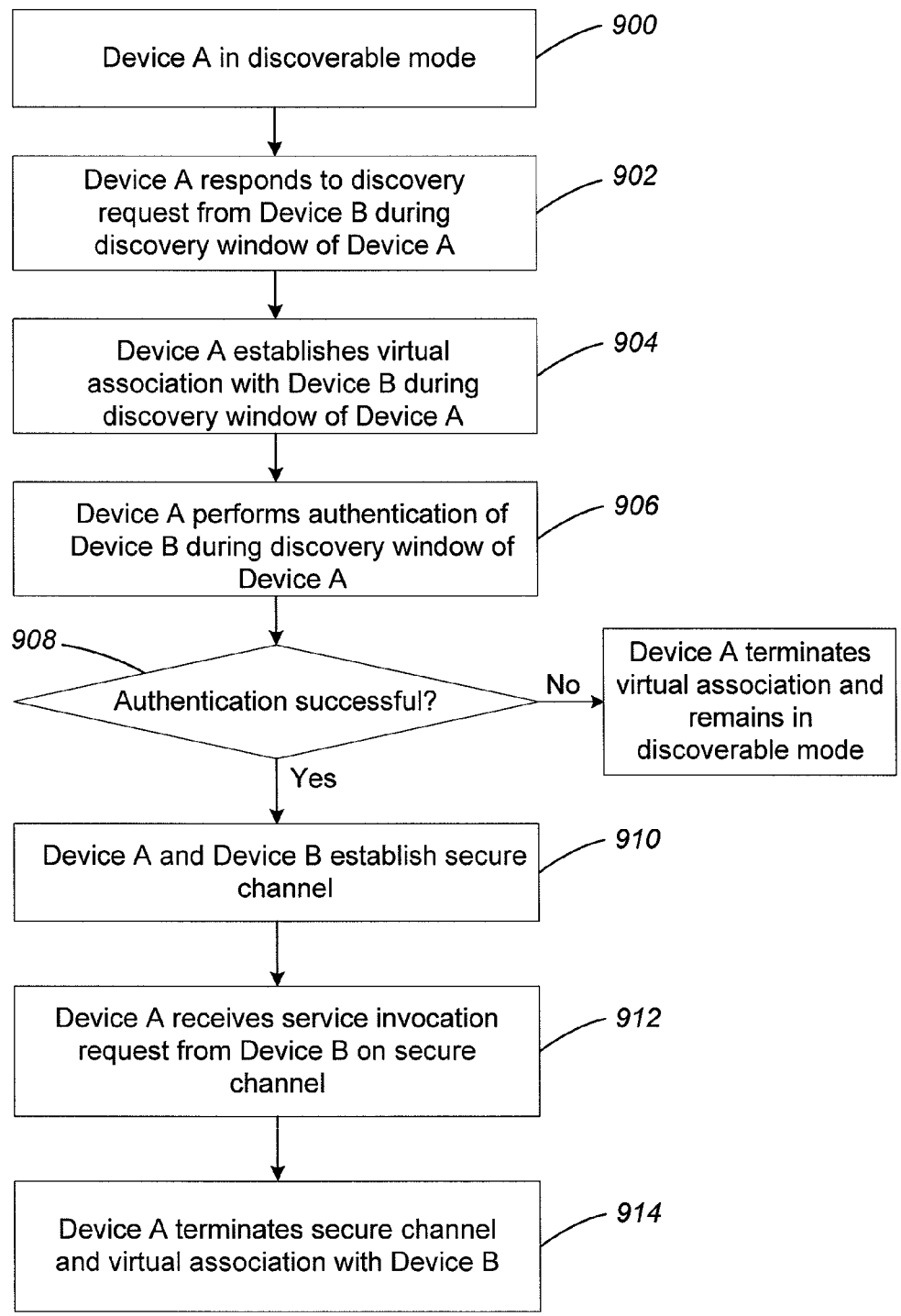
FIG. 9 is a flow chart that illustrates operation of a target wireless device in discoverable mode during discovery and remote service invocation.

The operations performed by device A in the remote authenticated service invocation protocol are shown in the flow chart of FIG. 9. In act 900, device A is placed in the discoverable mode, typically by a user, for power saving. In act 902, device A responds to a discovery request from device B during a discovery window of device A, as shown in FIGS. 3-5 and described above. In act 904, device A responds to a virtual association request from device B during a discovery window of device A. In act 906, device A performs authentication of device B during a discovery window of device A. As described above, mutual authentication may be completed during one discovery window or may require more than one discovery window for completion. Authentication may be based on a shared secret of Devices A and B. If the authentication is successful, as determined in act 908, device A and device B establish a secure channel in act 910. Device A receives a service invocation request from device B on the secure channel and may exchange information related to the service invocation request. Device A enables the requested service and in act 914 terminates the secure channel and the virtual association with device B. If the authentication is determined in act 908 to be unsuccessful, device A terminates the virtual association and remains in the discoverable mode, thus avoiding unnecessary use of power.

The operations of device A and device B are illustrated in FIGS. 8 and 9, respectively, and described above. It will be understood that a wireless device may be equipped to perform the functions of device A and device B in the above-described protocol. Thus, a wireless device equipped with the PEWSI protocol may initiate a remote service invocation request and may also respond to a remote service invocation request.

In the embodiments described above, device A and device B are wireless devices. In other embodiments, device A, device B, or both, may not be wireless devices. In general, device A and device B may be any computing devices and may communicate via any communication media, such as, for example, a wired connection, a wireless connection, an optical fiber connection, or a combination thereof. For example, device B may have a wired connection to an intermediate device, and the intermediate device may have a wireless connection to device A.

Figure 10:
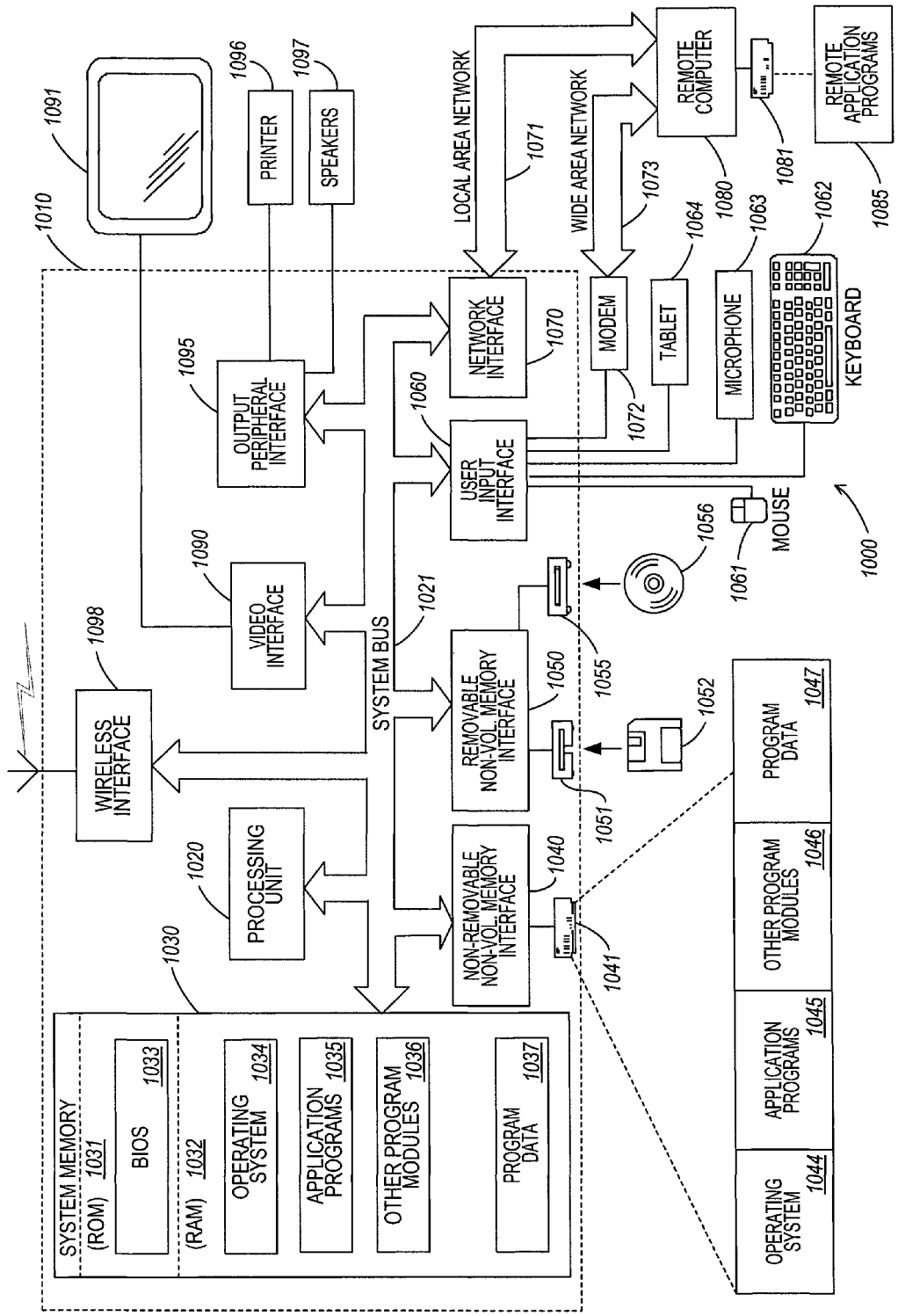
FIG. 10 is a block diagram generally illustrating an example of a computer system in which the present invention may operate.

FIG. 10 illustrates an example of a suitable computing system environment 1000 on which the invention may be implemented. The computing system environment 1000 is only one example of a suitable computing environment and is not intended to suggest any limitation as to the scope of use or functionality of the invention. Neither should be computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of a computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communication network. In a distributed computing environment, program modules may be located in both local and remote computer storage media including memory storage devices.

With reference to FIG. 10, an exemplary system for implementing the invention includes a general purpose computing device in the form of a computer 1010. Components of computer 1010 may include, but are not limited to, a processing unit 1020, a system memory 1030, and a system bus 1021 that couples various system components including the system memory to the processing unit 1020. The system 1021, may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1010 typically includes a variety of computer readable media. Computer readable media can be any available media that can be accessed by computer 1010 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1010. Combinations of the any of the above should also be included within the scope of computer readable storage media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable volatile/nonvolatile computer storage media. By way of example only, FIG. 10 illustrates a hard disk drive 1040 that reads from or write to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies.

A user may enter commands and information into the computer 1010 through input devices such as a keyboard 1062 and pointing device 1061, commonly referred to as a mouse, trackball or touch pad. Other input devices may include a microphone 1063, joystick, a tablet 1064, satellite dish, scanner, or the like. These and other input devices are often connected to the processing unit 1020 through a user input interface 1060 that is coupled to the system bus, but may not be connected by other interface and bus structures, such as a parallel port, game port or a universal serial bus (USB). A monitor 1091 or other type of display device is also connected to the system 1021 via an interface, such as a video interface 1090. In addition to the monitor, computers may also include other peripheral output devices such as speakers 1097 and printer 1096, which may be connected through a output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073 and a wireless link, for example via a wireless interface 1098 complete with an antenna, but may also include other networks. Such networking environments are commonplace in offices, enterprise-wide computer networks, intranets and the Internet. While wireless interface 1098 is shown directly connected to system bus 1021, it is recognized that the wireless interface 1098 may be connected to system bus 1021 via network interface 1070.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A method to operate a first computing device in communication with a second computing device, comprising:
    operating the first computing device in a discoverable mode including alternating between a discovery window of a discovery period and an inactive window of the discovery period;
    responding to a discovery request received from the second computing device during the discovery window of the discovery period, wherein prior to the discovery request the first computing device and the second computing device each store a shared secret key to be used for authentication;
    responding to an authentication request received from the second computing device during the discovery window of the discovery period;
    remaining in the discoverable mode at least until the first computing device has authenticated the second computing device, wherein the remaining is performed by extending a duration of the discovery window responsive to partial authentication of the second computing device;
    establishing, based on successful mutual authentication, a secure channel to the second computing device; and
    receiving a service invocation request from the second computing device on the secure channel and enabling execution of the requested service.

2. A method as defined in claim 1, wherein the first computing device comprises a first wireless device and the second computing device comprises a second wireless device, and wherein a radio of the first wireless device is powered down during the inactive window.

3. A method as defined in claim 1, wherein responding to the authentication request includes responding based on a shared secret of the first and second computing devices.

4. A method as defined in claim 1, wherein responding to the authentication request includes responding to a virtual association request received from the second computing device.

5. A method as defined in claim 1, wherein responding to the authentication request is performed during two or more discovery windows.

6. A method as defined in claim 1, further comprising receiving and/or transmitting information relating to the service invocation request on the secure channel.

7. A method as defined in claim 1, further comprising discovering other computing devices during an active discovery mode, and performing authentication and service invocation with a discovered computing device.

8. A computer readable storage medium encoded with computer-executable instructions that, when executed by a computing device, perform the method of claim 1, wherein the computer readable storage medium is not a signal.

9. A wireless device comprising:
a computing device;
a radio; and
a wireless module logically connected to the computing device and to the radio, the wireless device comprising a processor programmed with instructions for:
operating the wireless device in a discoverable node including alternating between a discovery window of a discovery period and an inactive window of the discovery period, the radio of the wireless device being powered down during the inactive window;
responding to a discovery request received from a second wireless device during the discovery window of the discovery period;
responding to an authentication request received from the second wireless device during the discovery window of the discovery period;
remaining in the discoverable mode at least until the wireless device has authenticated the second wireless device, wherein the remaining is performed by extending a duration of the discovery window based on partial authentication of the second computing device;
establishing, based on successful mutual authentication, a secure channel to the second wireless device; and
receiving a service invocation request from the second wireless device on the secure channel and enabling execution of the requested service.

10. A wireless device as defined in claim 9, wherein the instructions for responding to the authentication request include instructions for responding based on a shared secret of the wireless devices.

11. A wireless device as defined in claim 9, wherein the instructions for responding to the authentication request include instructions for responding to a virtual association request received from the second wireless device.

12. A wireless device as defined in claim 9, wherein the instructions for responding to the authentication request are executed during two or more discovery windows.

13. A wireless device as defined in claim 9, wherein the instructions further include instructions for receiving and/or transmitting information relating to the service invocation request on the secure channel.

14. A wireless device as defined in claim 9, wherein the instructions further include instructions for discovering other wireless devices during an active discovery mode and performing authentication and service invocation with a discovered wireless device.

15. A method to operate a second wireless device in direct communication with a first wireless device, comprising:
operating the second wireless device in an active discovery mode during an active discovery period;
transmitting one or more discovery requests during the active discovery period;
receiving from the first wireless device a discovery response that specifies a time and a duration of a discovery window of the first wireless device;
transmitting an authentication request to the first wireless device during the discovery window of the first wireless device;
establishing, based on successful mutual authentication, a secure channel to the first wireless device, wherein the mutual authentication is completed during an extension of the discovery window, the extension having been performed by the first device responsive to the first device partially completing the mutual authentication; and
transmitting a service invocation request to the first wireless device on the secure channel.

16. A method as defined in claim 15, wherein transmitting the authentication request includes transmitting a virtual association request to the first wireless device during the discovery window of the first wireless device.

17. A method as defined in claim 15, further including controlling completion of the authentication request during two or more discovery windows of the first wireless device.

18. A method as defined in claim 15, further comprising receiving and/or transmitting information relating to the service invocation request on the secure channel.

* * * * *